United States Patent
Bell et al.

(12)

(10) Patent No.: US 6,621,859 B1
(45) Date of Patent: Sep. 16, 2003

(54) COMBINED CABLE/DSL MODEM AND METHOD FOR HIGH SPEED DATA COMMUNICATION

(75) Inventors: Russell W. Bell, Freehold, NJ (US); Gabe P. Torok, Holmdel, NJ (US); James J. Michaels, Oceanport, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/248,440

(22) Filed: Feb. 11, 1999

Related U.S. Application Data (60) Provisional application No. 60/074,414, filed on Feb. 11, 1998.

(51) Int. Cl.[7] .................................................. H04B 1/38
(52) U.S. Cl. .................................... 375/222; 375/257
(58) Field of Search ................................ 375/222, 257, 375/260, 219, 220, 221, 259; 379/90.01, 413.02, 413.03; 709/218; 725/109, 111, 117, 122; 370/351

(56) References Cited

U.S. PATENT DOCUMENTS

| | | | | | |
|---|---|---|---|---|---|
| 4,330,687 A | * | 5/1982 | Foulkes et al. | ............. | 370/214 |
| 5,303,067 A | * | 4/1994 | Kang et al. | ................. | 358/442 |
| 5,756,280 A | * | 5/1998 | Soora et al. | ................. | 725/146 |
| 6,065,049 A | * | 5/2000 | Beser et al. | ................. | 709/218 |
| 6,084,881 A | * | 7/2000 | Fosmark et al. | ............ | 370/397 |

* cited by examiner

*Primary Examiner*—Betsy L. Deppe
(74) *Attorney, Agent, or Firm*—Thomas, Kayden, Horstemeyer & Risley (57) ABSTRACT

A combined cable/digital subscriber line (DSL) modem and method for data transmission. Upstream data is transmitted to a data communications network through a two wire pair to a central office using unidirectional DSL transmission. Downstream data is transmitted from the data communications network to the combined cable/DSL modem via a cable network using unidirectional cable transmission. Thus, bi-directional data communications is established using two unidirectional transmission links for faster and more efficient data communication.

3 Claims, 7 Drawing Sheets

COMBINED CABLE/DSL MODEM AND METHOD FOR HIGH SPEED DATA COMMUNICATION

CROSS REFERENCE TO RELATED APPLICATIONS

This application claims the benefit of co-pending United States Provisional Patent Application entitled "Combined Cable/DSL Modem for High Speed Data Transmission" filed on Feb. 11, 1998 and afforded Ser. No. 60/074,414.

STATEMENT REGARDING FEDERALLY SPONSORED RESEARCH OR DEVELOPMENT

Not Applicable.

1. Technical Field

This invention relates to the field of data communications, and, more particularly, to the field of data communications using unidirectional data transmission.

2. Background Information

At the present time, data communication is accomplished at increasing rates as data communication technology improves. For example, digital subscriber line (DSL) technology is currently employed to provide relatively high speed data communication over existing wire pairs that connect the typical customer premise to a local central office in the current telecommunications system.

In addition to the telephone network, existing cable networks provide many homes with cable television signals. Only a small percentage of the existing cable plant is suitable for high speed, bi-directional data transmission for various applications. The cost of upgrading the cable plant to facilitate more bi-directional data communication is very high.

Even though DSL technology provides significantly higher data communication rates than predecessor technologies, bi-directional DSL data communication requires significant complexity, resulting in higher cost than unidirectional DSL data communication as well as limitations in speed and transmission distance.

BRIEF SUMMARY OF THE INVENTION

The present invention provides for bi-directional data communication technology that avoids the expense of either upgrading existing network wiring (i.e., cable plant) or the complexity of bi-directional digital subscriber line (DSL) data communication.

In particular, the present invention entails a combined cable/DSL modem and method. The combined cable/DSL modem employs unidirectional data transmission over the existing cable plant for downstream data communication, and unidirectional DSL data transmission over the existing wire pairs employed by the telecommunications network in a single data communications loop.

According to one embodiment, a first combined cable/DSL or hybrid modem is located at a customer premise and a second hybrid modem is located at a cable provider premise. Downstream data traffic is transmitted from the second hybrid modem to the first hybrid modem through the existing cable network. Upstream traffic is transmitted from the first hybrid modem to the second hybrid modem across the local loop, which terminates at a central office. The local loop at the central office is coupled to the second modem at the cable provider premise by a direct link. In another embodiment of the present invention employs a digital repeater apparatus at the central office to establish a link between the local loop and the second modem located at the cable provider premise. In yet another embodiment, the second hybrid modem is located at the central office instead of the cable provider premise.

In further embodiments, a single hybrid modem is employed at the customer premise that transmits upstream data across a local loop to a digital subscriber line access multiplexer (DSLAM) which is coupled to a data communications network. The upstream data is then routed by the data communications network to a far data endpoint. Downstream data originating at the far data endpoint is transmitted to a cable transmitter via the data communications network. The downstream data is then transmitted by the cable transmitter to the single hybrid modem via a cable network. In addition, a direct link may be established between the DSLAM and a data memory cache near the cable transmitter. The data memory cache generally stores frequently accessed data from various far data endpoints in the data communications network once downloaded. A request for previously downloaded information may be communicated to the data cache, and, if the requested data is present, the cable transmitter may download such information to the single hybrid modem without downloading the data from a far data endpoint in the data communications network. The direct link may be established, for example, using a hardwire link, a DSL/DSL repeater circuit, or a private network.

The present invention also entails a method for bi-directional data communication, comprising the steps of: receiving a downstream data signal with a cable receiver circuit in a hybrid modem, the downstream data signal being transmitted across a cable network; and, transmitting an upstream data signal with a digital subscriber line transmitter circuit in the hybrid modem, the upstream data signal being transmitted across a local loop.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
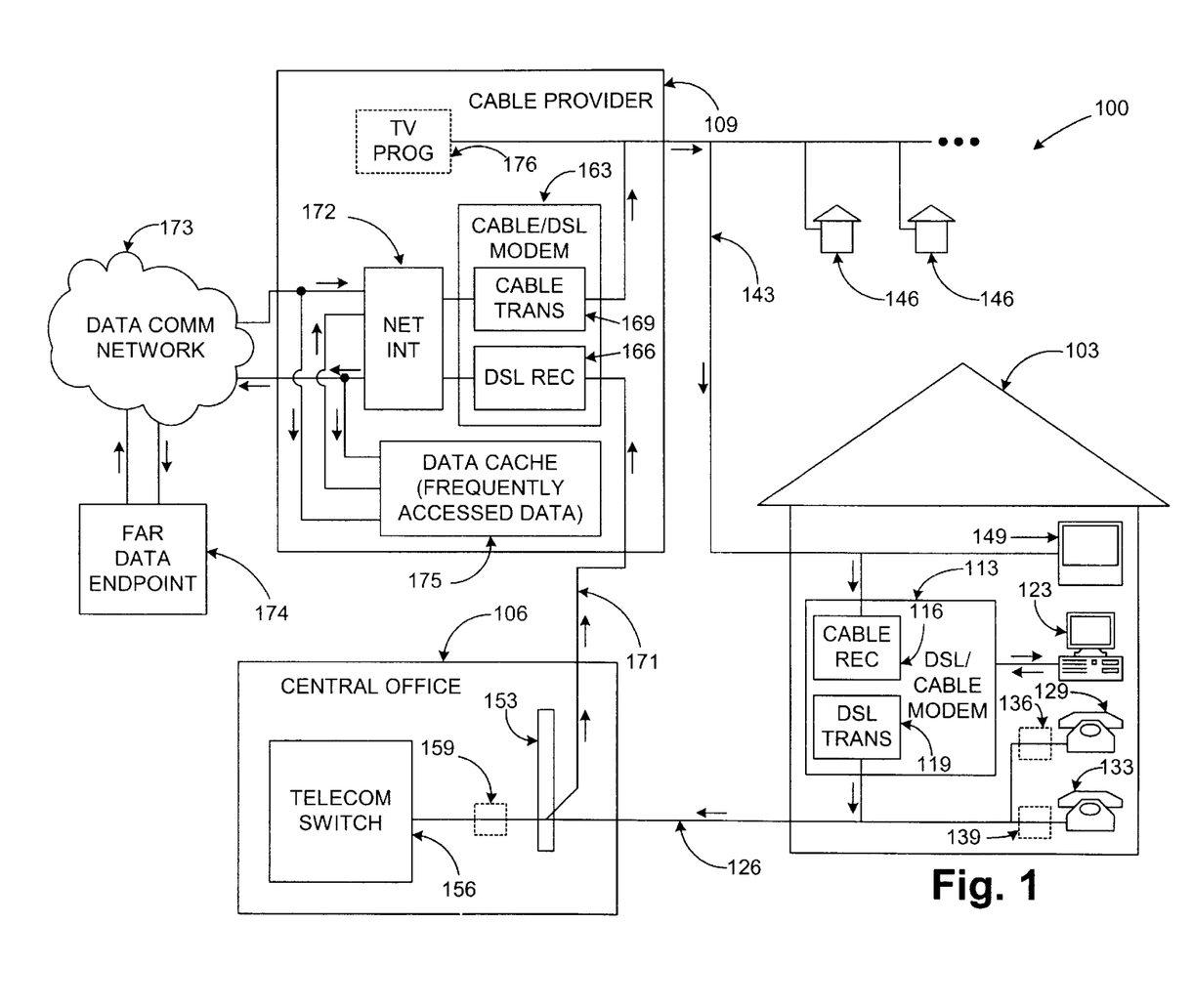
FIG. 1 is a block diagram showing a data communications loop having bi-directional data communication using a uni-directional digital subscriber line link and a unidirectional cable transmission link using two hybrid modems according to an embodiment of the present invention.

Turning to FIG. 1, shown is a data communication loop 100 according to a first embodiment of the present invention. The data communication loop 100 entails components located at a customer premise 103, a central office 106, and a cable provider premise 109. In the customer premise 103 is a hybrid modem 113 with a cable receiver circuit 116 and a digital subscriber line (DSL) transmitter circuit 119. A hybrid modem is defined herein as a modem, which includes a combination of cable and DSL data communications components. A data terminal device 123 is electrically coupled to the hybrid modem 113. The data terminal device 123 may be, for example, a computer or other similar device, which employs data communication. The DSL transmitter circuit 119 is electrically coupled to a local loop 126 at the customer premise 103. Also coupled to the local loop 126 are first and second telephones 129 and 133 which are representative of any number of telephones which may be employed at a typical customer premise 103. Electrically coupled between the local loop 126 and the first and second telephones 129 and 133 are optional DSL filters 136 and 139 which prevent DSL signals from reaching the first and second telephones 129 and 133.

The cable receiver circuit 116 is electrically coupled to a cable network 143. The cable network 143 is also coupled to other customer premises 146. A television 149 is electrically coupled to the cable network 143 in the customer premise 103.

At the central office 106, the local loop 126 is terminated at a main distribution frame 153. The local loop 126 is electrically coupled from the main distribution frame 153 to a telecommunications switch 156. Electrically coupled between the main distribution frame 153 and the telecommunications switch 156 is an optional filter 159 that prevents DSL signals from reaching the telecommunications switch 156.

A second hybrid modem 163 is located at the cable provider premise 109. The second hybrid modem 163 comprises a DSL receiver circuit 166 and a cable transmitter circuit 169. The DSL receiver circuit 166 is electrically coupled to the local loop 126 at the main distribution frame 153 of the central office 106 by a hardwire link 171. The cable transmitter circuit 169 is electrically coupled to the cable network 143. Also, a television programming transmitter 176 is coupled to the cable network 143. In addition, the second hybrid modem 163 is electrically coupled to a network interface 172, which in turn is coupled to a data communications network 173. The data communications network 173 is electrically coupled to a far data endpoint 174. The far data endpoint 174 may comprise a computer or other data terminal equipment that is in electrical communication with the data terminal device 123. The cable provider premise 109 further comprises a data cache 175 to store frequently accessed data that is obtained from the far data endpoint 174 over the data communications network 173.

Next the operation of the data communication loop 100 is described in which bi-directional data communication is established between the data terminal device 123 and the far data endpoint 174. In particular, the data terminal device 123 generates upstream data to be transmitted to the far data endpoint. The DSL transmitter circuit 119 modulates and then transmits the upstream data to the DSL receiver circuit 166 in the second hybrid modem 163 across both the local loop 126 and the hardwire link 171. The DSL receiver circuit 166 demodulates the upstream data that is then converted by the network interface to a data format employed by the data communications network 173. The upstream data is then transmitted to the far data endpoint is then transmitted to the far data endpoint 174 via the data communications network 173.

Downstream data traffic generated by the far data endpoint 174 is routed to the cable transmitter circuit 169 in the second hybrid modem 163 via the data communications network 173 and the network interface 172. At the cable transmitter circuit 169, the downstream data traffic is modulated into a format for transmission across the cable network 143. The cable transmitter circuit 169 then transmits the downstream data across the cable network 143 to the cable receiver circuit 116 in the first hybrid modem 113. Upon receiving the downstream data, the cable receiver circuit 116 demodulates the downstream data and supplies it to the data terminal device 123.

Note that the far data endpoint 174 is representative of any number of far data endpoints on the data communications network 173 which may communicate with multiple data terminal devices 123 in the manner shown. It may be the case the multiple data terminal devices 123 wish to access the same information provided by a single far data endpoint 174. In such cases, the information sought maybe stored in the data cache 175 and later provided to data terminal devices 123 upon demand, rather than downloading the same information from the far data endpoint 174 each time resulting in quicker data transfer. In such case, upstream data which contains a request to download specific data from the far data endpoint which was previously downloaded to the data cache 175 is received by the data cache 175 and the actual downstream data transmitted in response is supplied by the data cache 175.

The present invention provides an advantage in that unidirectional transmission of DSL data over existing local loops 126 comprised of wire pairs is significantly simpler and has better performance than simultaneous bi-directional transmission. Also, the complexity of unidirectional transmission of data across the cable network 143 is relatively low and cost effective. Consequently, the present invention facilitates simultaneous bi-directional data communication using the low complexity of half-duplex, unidirectional transmission schemes.

In addition, downstream data rates are generally much higher than upstream rates from many sources. Cable networks 143 provide an excellent, high speed broadcast medium for downstream data communication and telephone networks, i.e. local loops 126, provide an excellent, lower speed medium for upstream data communication.

Also, since the transmit and receive paths are separate, the present invention provides a further advantage in that the security of the data communication is improved. In particular, a potential eavesdropper can only view one side of a particular communications session making is more difficult to decipher encrypted data.

Yet another advantage of the present invention involves the relief of excessive congestion in telephone switches 156 due to data communications. The standard telephone switch 156 typically was not designed to support data communications services. In particular, telephone switches 156 are designed to support telephone calls of a certain statistical length, typically 4 to 5 minutes. Data communication contacts tend to be very long, in excess of 30 to 50 minutes, which creates long "call holding times". These long call holding times create a significant problem in that they may result in excessive congestion which, in turn, causes telephone outages. The several embodiments of the present invention route upstream data traffic around the telephone switch 156, thus alleviating any potential congestion associated with data traffic.

Figure 2:
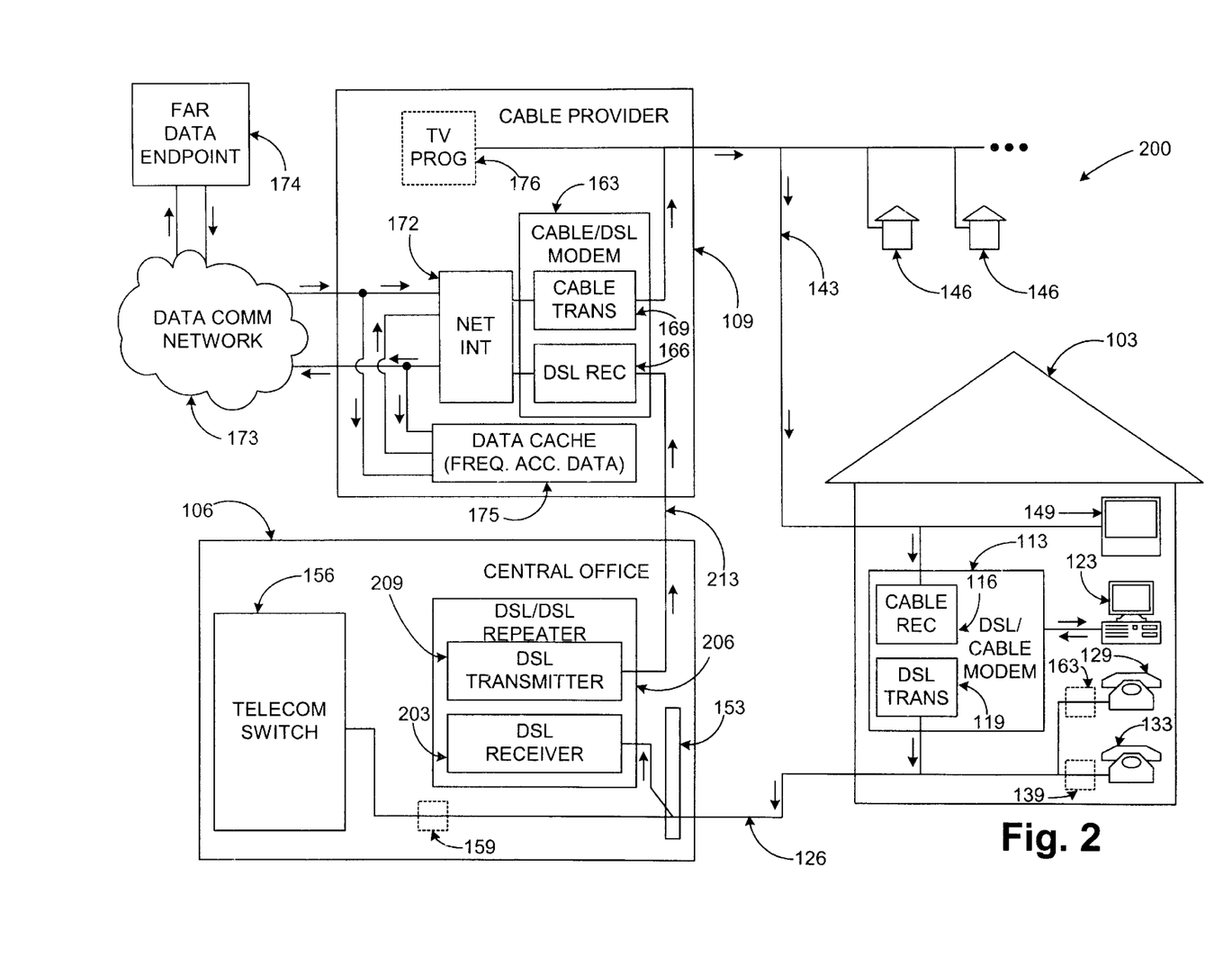
FIG. 2 is a block diagram showing a data communications loop having bi-directional data communication using a uni-directional digital subscriber line link and a unidirectional cable transmission link using two hybrid modems according to another embodiment of the present invention.

Referring next to FIG. 2, shown is a data communication loop 200 according to a second embodiment of the present invention. The data communication loop 200 is similar to the data communication loop 100 of the first embodiment with a few differences in the communications link between the central office 106 and the cable provider premise 109. Specifically, the local loop 126 is electrically coupled at the main distribution frame 153 to a DSL receiver circuit 203 in a DSL/DSL repeater 206. A DSL transmitter circuit 209 in the DSL/DSL repeater 206 is electrically coupled to the DSL receiver circuit 166 in the second hybrid modem 163 via a DSL/DSL line 213.

The downstream data traffic is accomplished in a similar manner to the data communication loop 100. However, the pathway for the upstream data traffic differs in that the upstream data generated by the data terminal device 123 is transmitted from the DSL transmitter circuit 119 in the first hybrid modem 113 to the DSL receiver circuit 203 in the DSL/DSL repeater 206 via the local loop 126. Thereafter, the upstream data is transmitted from the DSL transmitter 209 in the DSL/DSL repeater 206 to the DSL receiver 166 in the second hybrid modem 163 over the DSL/DSL line 213. The data communication loop 200 is preferable when it is not feasible to provide a hard wire link 171 (FIG. 1) between the main distribution frame 153 and the DSL receiver circuit 166 of the second hybrid modem 163. This may be the case, for example, when the distance between the central office 106 and the cable provider premise 109 is greater than a few thousand feet. The DSL/DSL repeater 206 serves to boost the upstream data signal for transmission across the DSL/DSL line 213.

Figure 3:
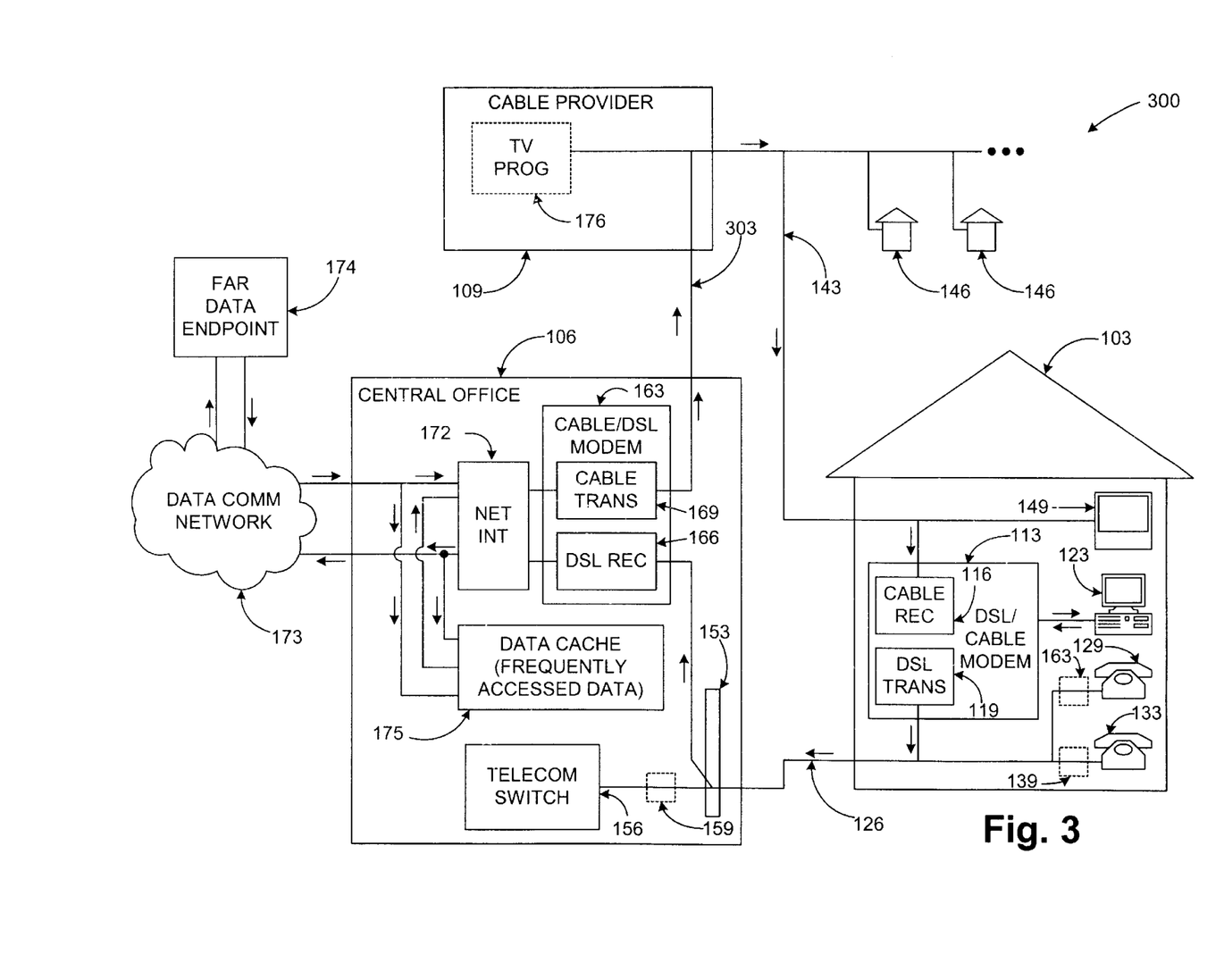
FIG. 3 is a block diagram showing a data communications loop having bi-directional data communication using a uni-directional digital subscriber line link and a unidirectional cable transmission link using two hybrid modems according to another embodiment of the present invention.

Referring to FIG. 3, shown is a data communications loop 300 according to a third embodiment of the present invention. The data communication loop 300 includes many of the same components as the data communication loop 100. However, the data communication loop 300 differs in that the second hybrid modem 163, the network interface 172, and the data cache 175 are located at the central office 106 instead of the cable provider premise 109. To explain further, the local loop 126 is electrically coupled to the DSL receive circuit 166 of the second hybrid modem 163 at the main distribution frame 153 in the central office 106. The cable transmit circuit 169 is electrically coupled to the cable network 143 using a cable hardwire link 303. The second hybrid modem 163 is electrically coupled to the data communications network 173 at the central office 109 via the network interface 172.

According to the third embodiment, downstream data generated by the far data endpoint 174 is transmitted to the cable transmitter circuit 169 in the second hybrid modem 163 via the data communication network 173. Thereafter, the downstream data is modulated and transmitted from the cable transmitter circuit 169 to the cable receiver circuit 116 in the first hybrid modem 113 via the cable hardwire link 303 and the cable network 143.

The upstream data generated by the data terminal device 123 is modulated and transmitted from the DSL transmitter circuit 119 in the first hybrid modem 113 to the DSL receiver circuit 166 in the second hybrid modem 163 via the local loop 126. The cable hardwire link 303 is preferable when facilities capable of transmitting cable television signals are available between the central office 106 and the cable provider premise 109. Note the data cache 175 allows frequently accessed data to be downloaded from the far data endpoint 174 to the central office 106 for access at the central office 106 by subsequent users as discussed with reference to FIGS. 1 and 2.

Figure 4:
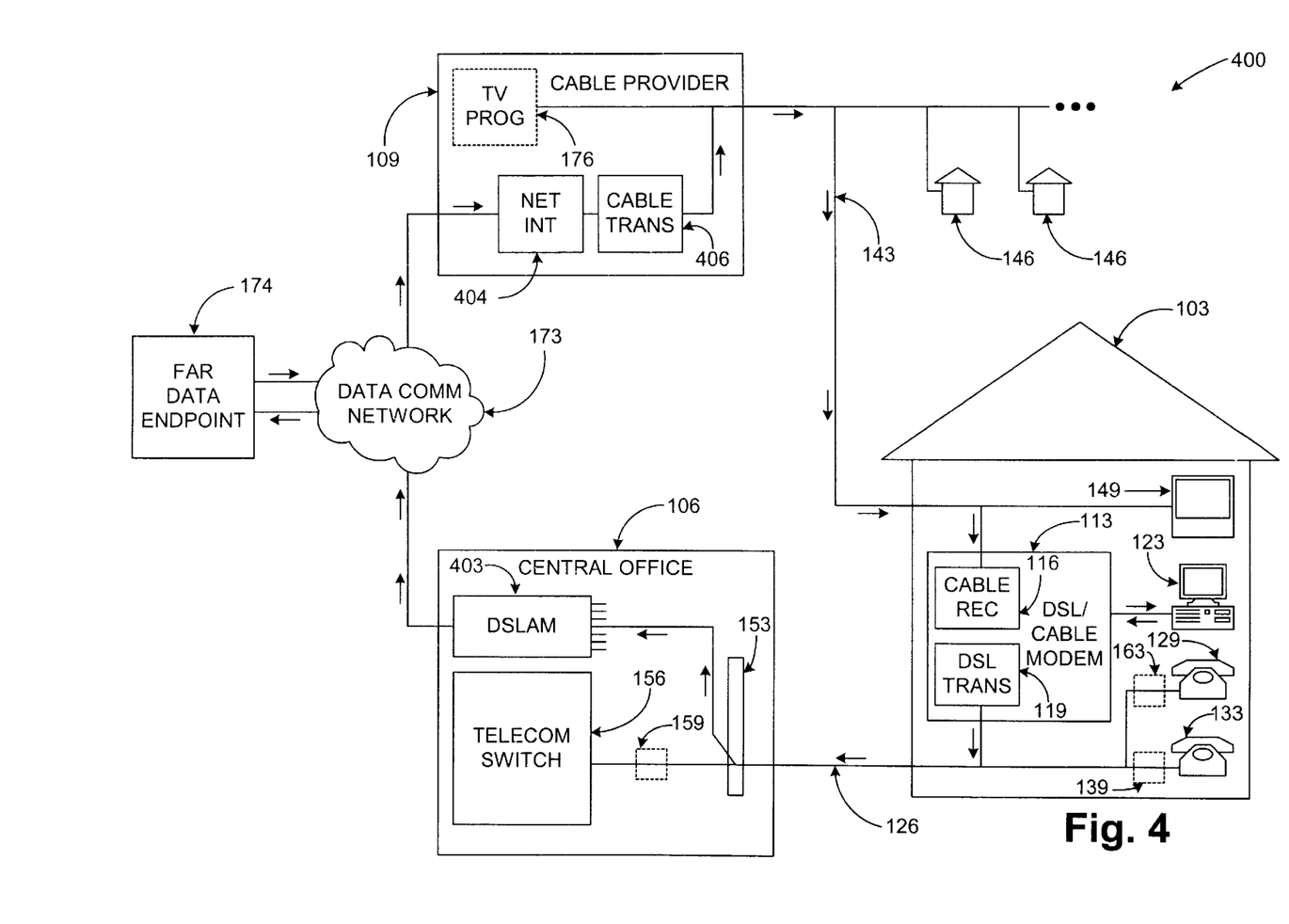
FIG. 4 is a block diagram showing a data communications loop having bi-directional data communication using both a unidirectional digital subscriber line link and a unidirectional cable transmission link coupled to a data communications network according to another embodiment of the present invention.

Turning to FIG. 4, shown is a data communications loop 400 that includes the customer premise 103, the central office 106, and the cable provider 109. The customer premise 103 is as described previously with reference to FIG. 1. However, the central office 106 includes a digital subscriber line access multiplexer (DSLAM) 403 which features multiple inputs, one of which is coupled to the local loop 126 via the main distribution frame 153. The local loop 126 is also electrically coupled from the main distribution frame 153 to a telecommunications switch 156 in the manner described with reference to FIG. 1. The output of the DSLAM 403 is in turn coupled to the data communications network 173 which is coupled to the far data endpoint 174. The data communications network 173 is also coupled to a network interface 404 which in turn is coupled to a cable transmitter circuit 406 in the cable provider premise 109. The cable transmitter circuit 406 has an output coupled to the cable network 143.

In the data communications loop 400, upstream data originates at the data terminal device 123. The DSL transmitter circuit 119 in the hybrid modem 113 then modulates and transmits the upstream data onto the local loop 126, through the main distribution frame 153 to the DSLAM 403. Thereafter, the DSLAM 403 demodulates the upstream data and transmits it to the far data endpoint 174 through the data communications network 173 in the data communications network format.

The downstream data originates at the far data endpoint 174 and is transmitted to the cable transmitter circuit 406 through the data communications network 173 and the network interface 404. The cable transmitter circuit 406 modulates the downstream data and then transmits it to the hybrid modem 113 across the cable network 143. The cable receiver circuit 116 receives the downstream data in the hybrid modem 113, demodulates the data, and, supplies the downstream data to the data terminal device 123. Thus, the data communications loop 400 includes two different points at which the data communications network 173 is accessed to establish bi-directional data communication.

Figure 5:
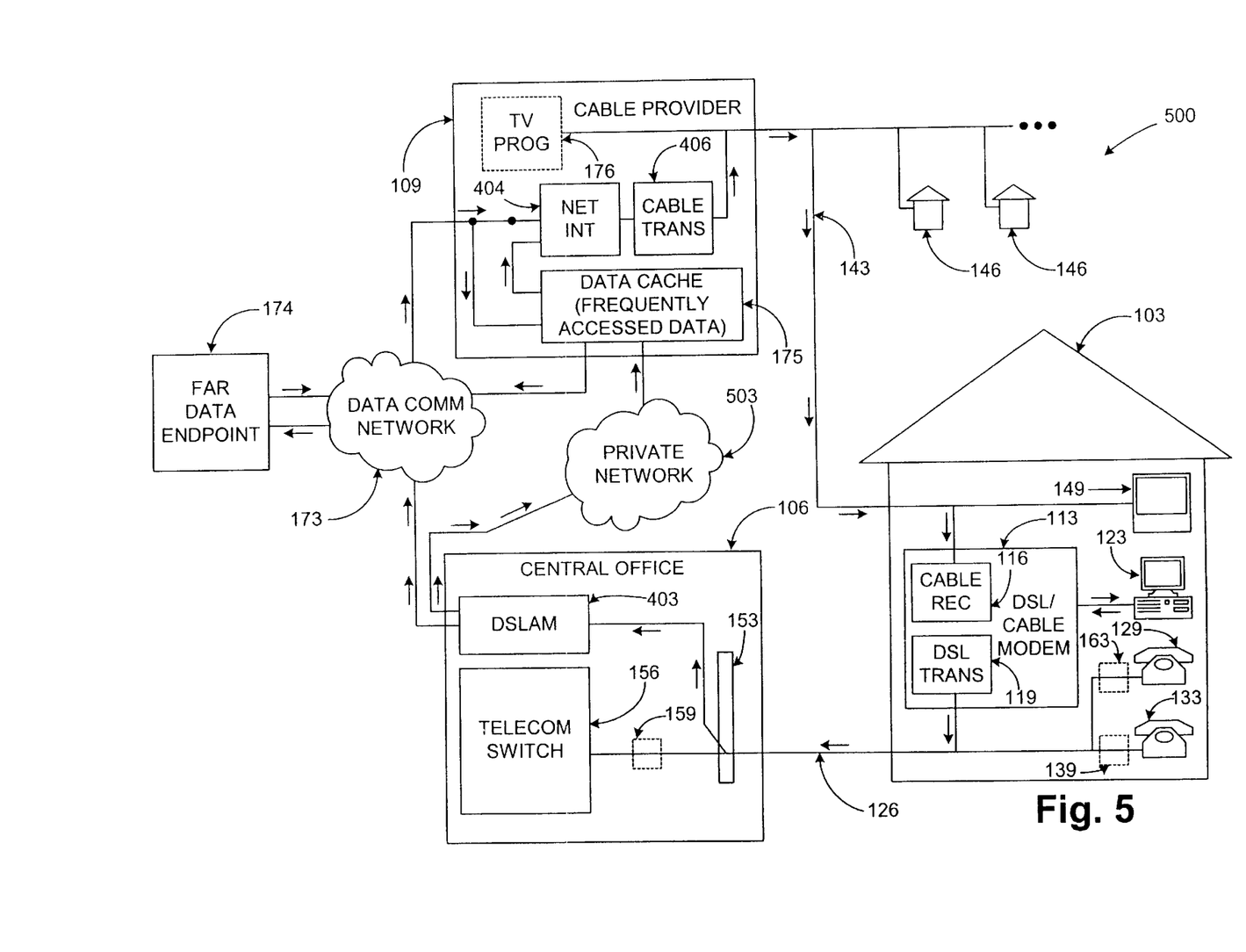
FIG. 5 is a block diagram showing the data communications loop of FIG. 4 with a direct link established between the unidirectional digital subscriber line link and the unidirectional cable transmission link using a private network according to another embodiment of the present invention.

Referring next to FIG. 5, shown is a data communications loop 500 according to a fifth embodiment of the present invention. The data communication loop 500 is similar to the data communications loop 400 with the addition of a direct link between the central office 106 and the cable provider premise 109 using a private network 503 and a data cache 175. Specifically, the DSLAM 403 includes a second output that is coupled through the private network 503 to a data cache 175 in the cable provider premise 109. The data cache 175 is coupled to and receives data from the data communications network 173 and is also coupled to and supplies downstream data to the network interface 404. The data cache 175 is also separately coupled to the data communications network 173 to transmit data to the far data endpoint 174 as will be described.

The data cache 175 receives and stores frequently accessed data from the far data endpoint 174 when downloaded by the data terminal device 123 or other data terminal devices in other customer premises 103. When the data sought from the far data endpoint 174 by the data terminal device 123 at the customer premise 103 has already been downloaded to the data cache 175 as the downstream data from previous data communications, the direct link allows the data terminal device 123 to receive the data sought from the data cache 175 rather than waiting for the data sought to be downloaded from the far data endpoint 174. In particular, the cable provider premise 109 receives a request for the data held on the data cache 175 directly from the central office 106 through the private network 503 and supplies the data sought from the data cache 175. Downloading data from the data cache 175 bypasses both the data communications network 173 and the far data endpoint 174 and, consequently, increases the speed of the data communications loop 500. When data is supplied to the data terminal device 123 from the data cache 175 as described above, a data request cancel signal is transmitted from the data cache 175 to the far data endpoint 174. This data request cancel signal cancels the request for data from the far data endpoint 174 that was generated by the data terminal device 123 in the first place.

Figure 6:
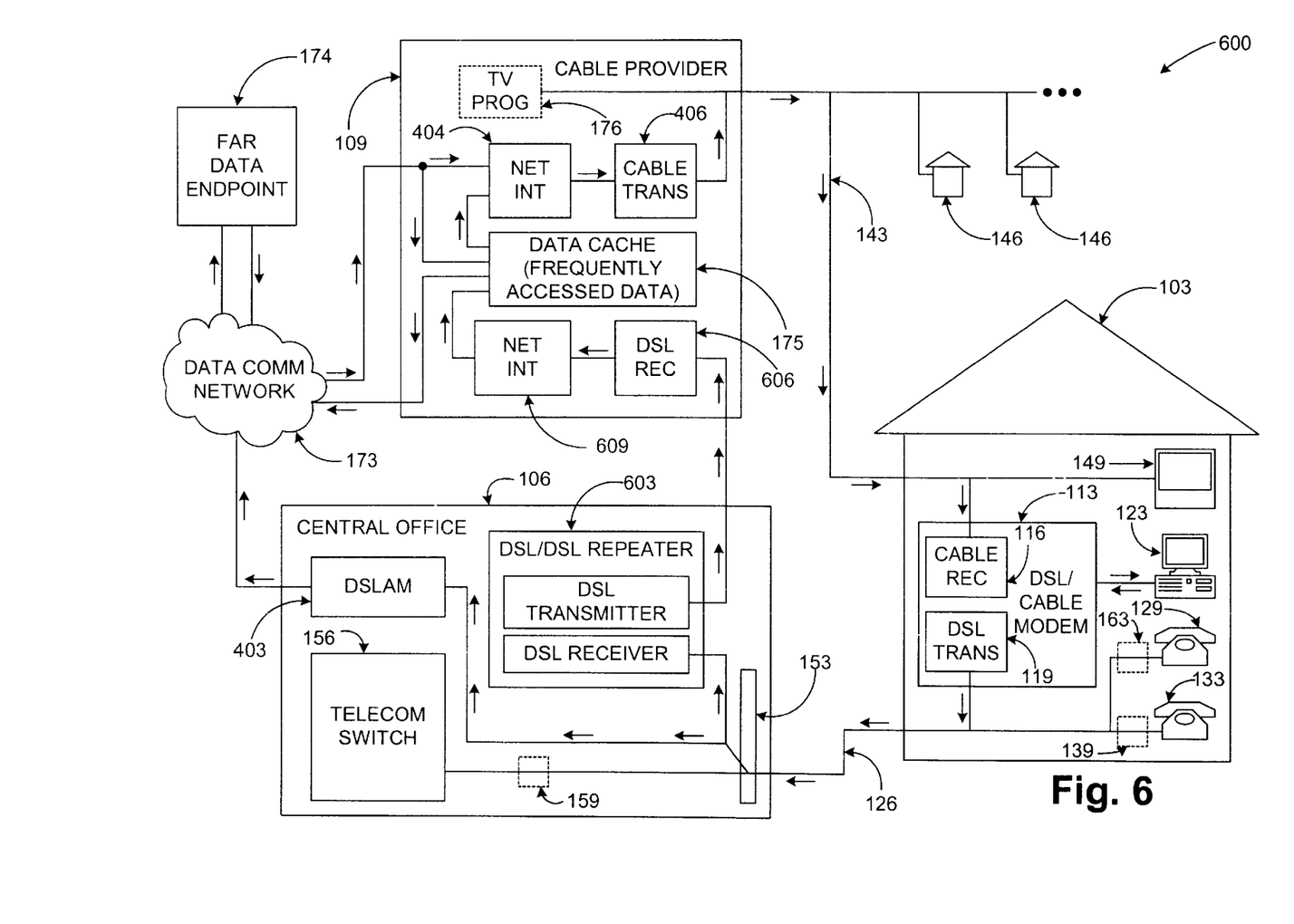
FIG. 6 is a block diagram showing the data communications loop of FIG. 4 with a direct link established between the unidirectional digital subscriber line link and the unidirectional cable transmission link using a second digital subscriber line link according to another embodiment of the present invention.

With reference to FIG. 6, shown is a data communications loop 600 that is similar to the data communications loop 500 as described above with the exception that the direct link between the central office 106 and the cable provider premise 109 is a direct digital link. Specifically, the local loop 126 is coupled through the main distribution frame 153 to both the DSLAM 403 and a DSL/DSL repeater 603. The DSL/DSL repeater has a DSL transmitter coupled to a DSL receiver 606 in the cable provider premise 109. The DSL receiver 606 in turn is coupled to the data cache 175 via a network interface 609, assuming the data cache 175 holds data in the format used by the data communications network 173. The DSL/DSL repeater 603 serves to boost the data signal for transmission across the direct link such as when the distance between the central office 106 and the cable provider premise 109 is greater than a few thousand feet.

Figure 7:
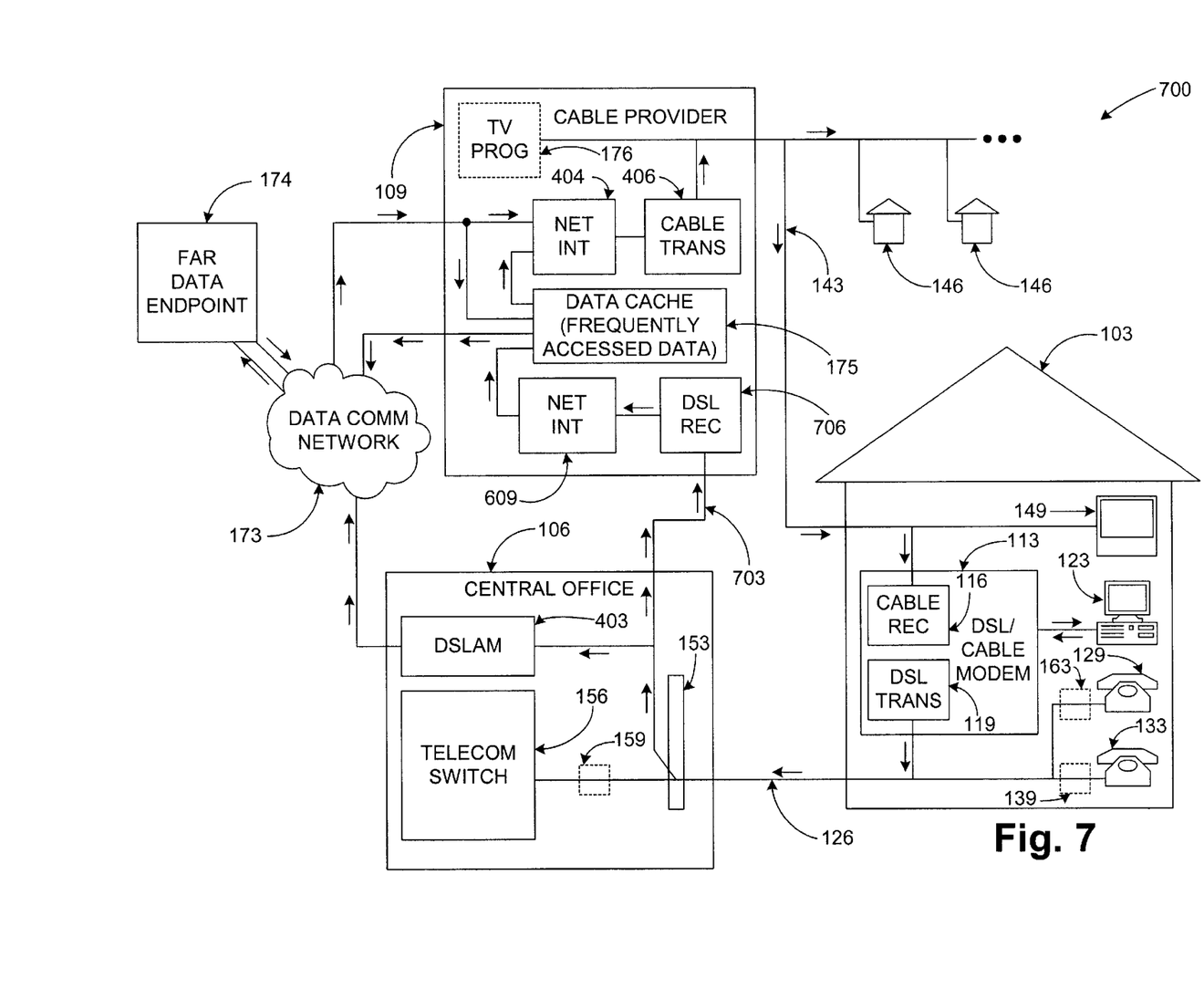
FIG. 7 is a block diagram showing the data communications loop of FIG. 4 with a direct link established between the unidirectional digital subscriber line link and the unidirectional cable transmission link using a hardwire link according to another embodiment of the present invention.

Finally, with reference to FIG. 7, shown is a data communications loop 700 which is similar in most respects to the data communications loop 500 described above with the exception that the direct link between the central office 106 and the cable provider premise 109 is established via a direct hardwire link 703 between the main distribution frame 153 and a DSL receiver circuit 706.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A data communications loop, comprising:
    a first hybrid modem having a cable receiver circuit and a digital subscriber line (DSL) transmitter circuit;
    a cable transmitter circuit;
    a digital subscriber line access multiplexer (DSLAM);
    a far data endpoint;
    a cable network electrically coupling the cable transmitter circuit to the cable receiver circuit;
    a local loop electrically coupling the DSL transmitter circuit to the DSLAM;
    a data memory cache coupled to the cable transmitter;
    a direct link between the digital subscriber line access multiplexer and the data memory cache, the direct link being configured to bypass a data communications network and the far data endpoint; and
    the data communications network coupling the DSLAM and the cable transmitter to the far data endpoint.

2. The data communications loop of claim 1, wherein the direct link is established through a private network.

3. The data communications loop of claim 1, wherein the direct link is established through a hardwire link.

* * * * *